Nov. 2, 1943.     J. P. WATSON     2,333,605
APPARATUS FOR USE IN FIRE CONTROL OF ANTIAIRCRAFT GUNS
Filed June 4, 1938     2 Sheets-Sheet 1
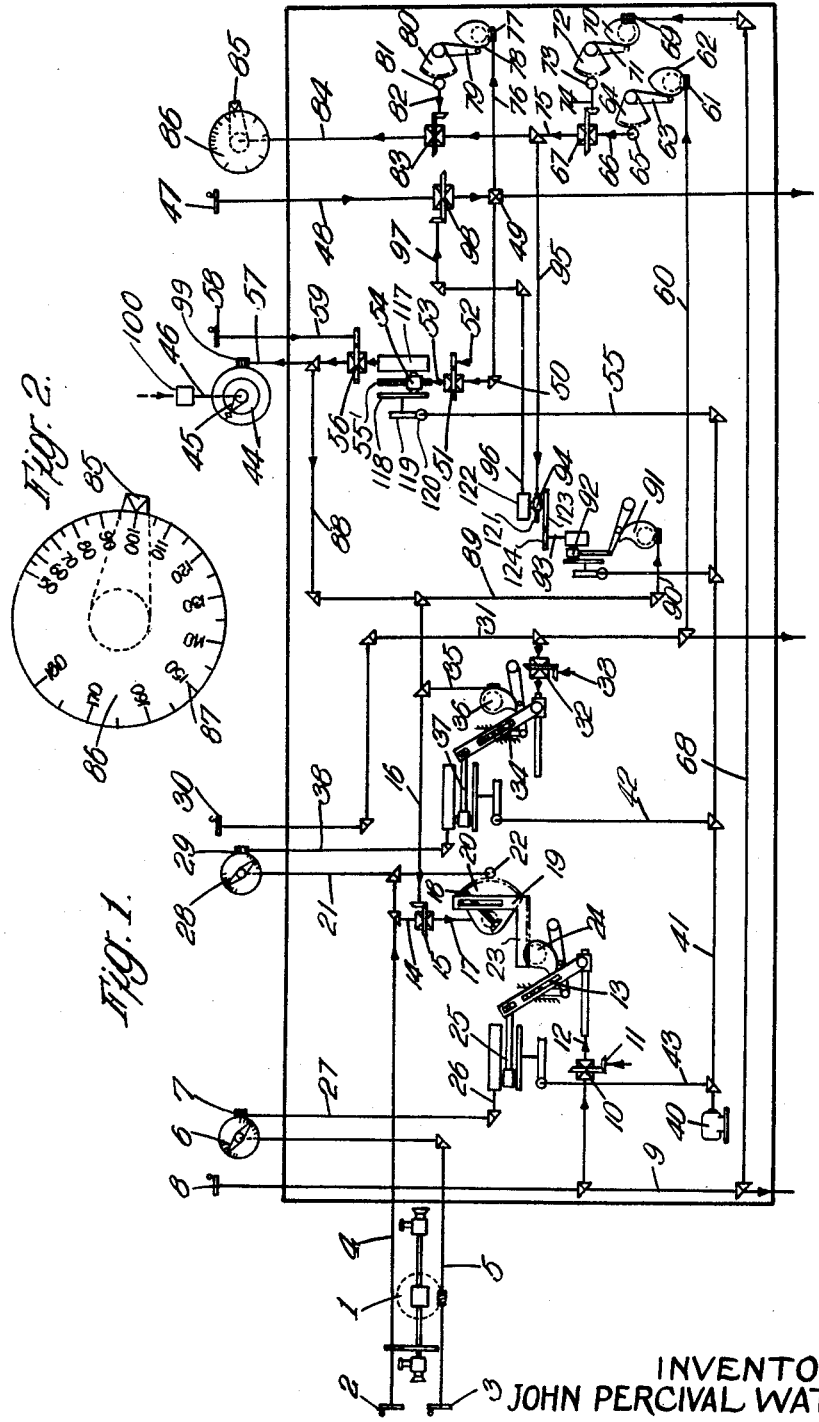
INVENTOR:
JOHN PERCIVAL WATSON
BY Haseltine, Lake & Co.
ATTORNEYS

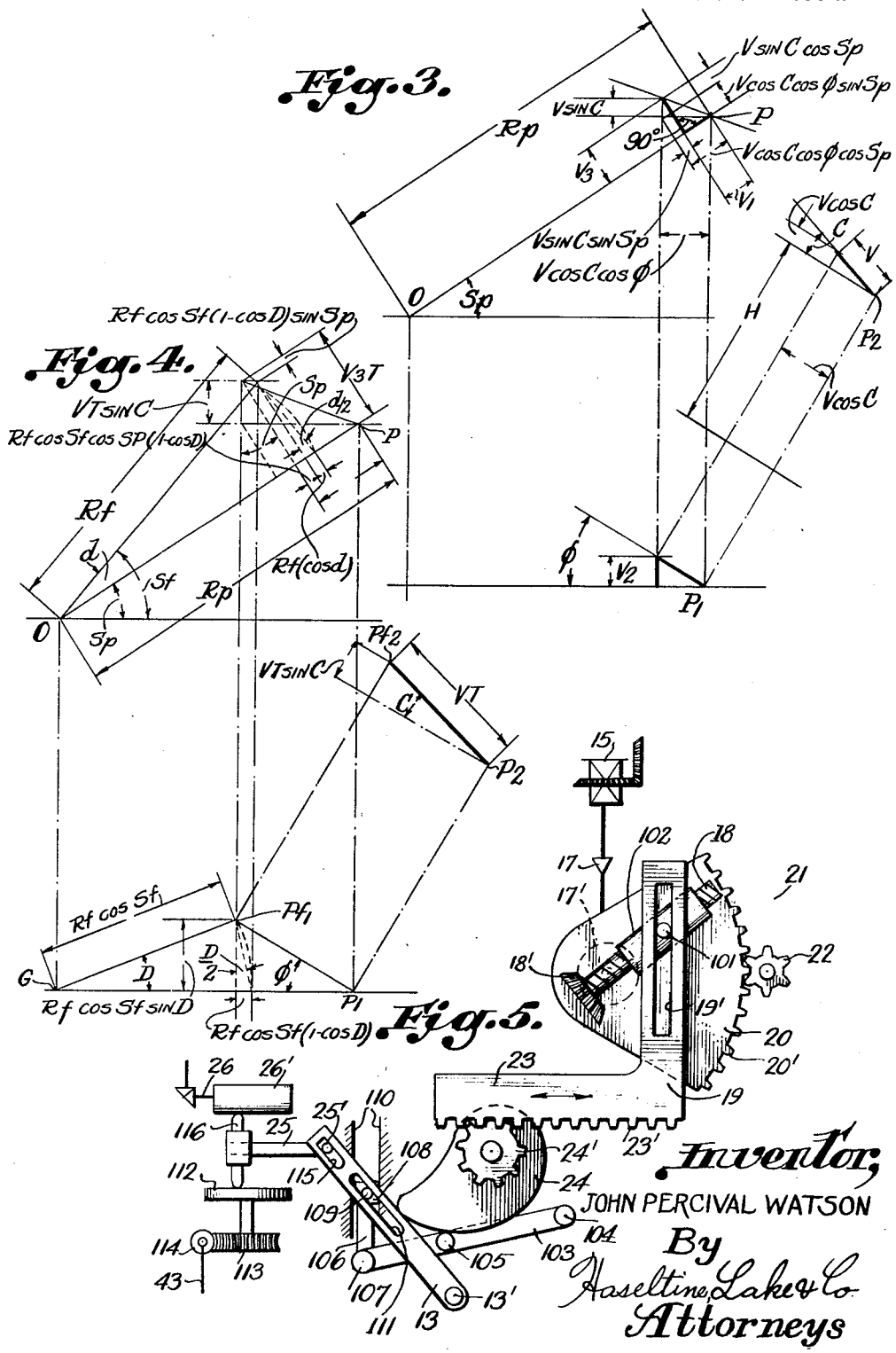

Patented Nov. 2, 1943

2,333,605

UNITED STATES PATENT OFFICE 2,333,605

APPARATUS FOR USE IN FIRE CONTROL OF ANTIAIRCRAFT GUNS

John Percival Watson, Westminster, London, England, assignor to Vickers-Armstrong Limited, London, England, a British company Application June 4, 1938, Serial No. 211,841
In Great Britain June 9, 1937

1 Claim. (Cl. 235—61.5)

This invention relates to apparatus for use in fire control of anti-aircraft guns, and to apparatus of the type including a predictor or calculator in which the target vector of course and speed is dealt with in the form of a plurality of vector components to obtain the required data for the guns.

To identify the motion of the target, a system of three vectors may be employed, these being the component vectors referred to, so that the vectorial sum thereof will give the vector that represents the target speed as it actually is. For convenience of working, the component vectors are chosen mutually at right angles, and will be referred to hereinafter as vectors $V_1$, $V_2$ and $V_3$. The vector $V_1$ represents the linear rate of approach or recession of the target along the line of sight from the observation point; the vector $V_2$ represents the linear rate of movement of the target in a direction at right angles to the plan view of the line of sight; the vector $V_3$ represents the linear rate of movement of the target in a vertical plane at right angles to the line of sight. The vector equivalent to the vectorial summation of $V_1$, $V_2$ and $V_3$ will be taken as represented by V.

In systems including the three vector determination of target travel, two of the vectors such as $V_2$ and $V_3$ can in general be determined accurately and continuously if intermittent values of range are available, but the third vector, such as $V_1$, can only be determined with difficulty and, after considerable expiration of time, with the aid of the intermittent ranges obtained by the rangefinder.

It is the chief object of the invention to devise apparatus in a system having a plurality of component vectors, whereby the value of one of the component vectors may be ascertained with a knowledge of the remaining component vectors, and an estimated, or otherwise ascertained, knowledge of the vector actually representing the movement of the target. It is also more specifically an object of the invention to devise a system capable of readily ascertaining the value of the vector $V_1$ with a knowledge of $V_2$ and $V_3$, and an estimated or otherwise ascertained value for V.

According to the invention, in apparatus of the type referred to, there is provided mechanism for computing the sum of the squares of the magnitudes of a plurality of component vectors, so that the square of the magnitude of the true motion represented by the vector components is obtained, one of the vector components being varied in magnitude whilst the computation is carried out until the solution given is in accordance with the square of the estimated, or otherwise known, magnitude of the speed vector representing the vectorial sum of such components, whereby the true value of the varied component may be rapidly ascertained.

According to a further feature of the invention, a means is employed which allows indication of the root of the sum of the squares of the vector components in question, whereby the magnitude of the motion represented by the vectorial summation of such components may be directly observed.

In applying the invention to the vector system comprising the three vector components $V_1$, $V_2$ and $V_3$, the apparatus is applied to the determination of $V_1$ by a knowledge of $V_2$ and $V_3$, there being mechanism for summing the squares of $V_2$ and $V_3$ and for adding thereto the square of an arbitrary quantity, which is adjusted to a correct value for $V_1$ by observing the ultimate value for V produced and adjusting the latter to the estimated, or otherwise ascertained, true value of V.

Other features of the invention will become apparent from the particular description hereinafter.

In order that the said invention may be clearly understood and readily carried into effect the same will now be more fully described with reference to the accompanying drawings, in which:

Figure 1 shows diagrammatically the method of employing the invention in a fire control system.

Figure 2 is a detail of the apparatus shown in Figure 1.

Figure 3 is a vector diagram serving to illustrate certain vector relations, and Figure 4 is a further vector diagram which in this case serves to illustrate how certain fundamental relations upon which the invention is based, are obtained.

Figure 5 is an enlarged fragmentary view of detail of Figure 1.

In the description that now follows the symbols listed below will be used:

T=the time of flight of the projectile concerned,
$R_p$=the present range of a target P from an observation point O,
$R_f$=the future range of the target P from the observation point O after lapse of time T,
$S_p$=the present angle of sight of the target from the observation point,
$S_f$=the future angle of sight after time T,
D=the lateral angular deflection in azimuth which it is necessary to give the gun in order to bring the line of fire from the present position of the target to the future position.
d=the angular deflection in the vertical plane necessary to move the line of fire from the present to the future position of target.
V=the vector representing the true rate of change of position of the target along its actual course.

The vector diagram of Figure 3 is composite in that it includes a diagram of the vectors as seen in elevation and also as seen in plan. O is the observation point in side elevation and P is the target whose true rate of change of position along its true path is V. The target is shown in plan at P₁, and projected from the plan of P₁ there is the target position P₂ which takes into account the vertical and horizontal angular displacements of the vector V, so that from P₂ a true length representing V in magnitude may be drawn. The angle indicated by C is the angle between a horizontal plane through P₂ and the vector V along its actual course in space or the true angle of climb of the target relative to a horizontal plane. The angle $\phi$ is the angle between the line of sight when projected into a horizontal plane and the target vector V when similarly projected.

The vector values of $V_1$, $V_2$ and $V_3$, are marked upon the diagram and it will be understood that values for these three vectors may be derived in terms of the vector V and the angles C, $\phi$ and $S_p$. From the figure these values are found to be:

$$V_1 = V \cos C \cdot \cos \phi \cos S_p - V \sin C \sin S_p$$
$$V_2 = V \cos C \cdot \sin \phi$$
$$V_3 = V \cos C \cdot \cos \phi \cdot \sin S_p + V \sin C \cdot \cos S_p$$

In Figure 4 there is shown a similar diagram to that shown in Figure 3 except that two positions of the target are indicated. As before there is the observation point O and the target P as seen in elevation. There is, however, also shown the future position $P_f$ of the target corresponding to the future range $R_f$. $P_2$ is the present target position and $P_{f2}$ the future target position after the time of flight T, the line $P_2$—$P_{f2}$ representing in magnitude the target travel. In Figure 4, $P_1$ has the same significance as in Figure 3, except that it indicates the present position of the target, whilst $P_{f1}$ indicates the future position of the target, as seen when the line $P_2$—$P_{f2}$ is projected upon the horizontal plane to obtain a plan view. The gun that is to engage the target is indicated at a point G and from the definitions of the symbols given above it will be seen that the angle between the line $GP_1$ and $GP_{f1}$ equals D. From inspection of the figure, the following three fundamental relations separately involving $V_1$, $V_2$ and $V_3$, may be derived.

$$R_f = R_p - V_1 T + R_f \cos S_p \cdot \cos S_f (1 - \cos D) + R_f (1 - \cos d) \quad (1)$$

$$\sin D = \frac{V_2 T}{R_f \cos S_f} \quad (2)$$

$$\sin d = \frac{V_3 T}{R_f} - \sin S_p \cdot \cos S_f (1 - \cos D) \quad (3)$$

Equation (3) may be re-written as follows:

$$d = \frac{V_3}{K} + a - \frac{V_3}{K} \cdot \left(\frac{R_f - KT}{R_f}\right) - C_v \quad (4)$$

In Equation 4, $a$ represents the difference between $d$ and $\sin d$, whilst for simplicity the expression $[\sin S_p \cos S_f (1 - \cos D)]$, has been replaced by the single symbol $C_v$. The constant K also introduced, will obviously cancel on rearranging the Equation 4, so that this constant may be arbitrarily chosen within finite limits. Thus K may be chosen so that KT is made very nearly equal to $R_f$, in which case the expression $$\left[\frac{V_3}{K} \cdot \left(\frac{R_f - KT}{R_f}\right)\right]$$

becomes negligible as compared with $$\left(\frac{V_3}{K}\right)$$

and therefore the deflection $d$ becomes substantially equal to $$\left(\frac{V_3}{K}\right)$$

since both $a$ and $C_v$ are small and in any case tend to cancel out. The major part of the deflection $d$ may, therefore, be directly determined from the value obtained for the vector $V_3$, and such major portion of the deflection may be applied into the gun transmission leaving only a small correction to be determined in order to complete fully the solution of Equation 4.

Similarly, Equation 2 may be treated in like manner and reduced to a simpler expression in $V_2$ and D in the following way:

$$\cos S_f \sin D = \frac{V_2}{K} - \frac{V_2}{K} \cdot \left(\frac{R_f - KT}{R_f}\right) \quad (5)$$

or, $$\sin D_p = \frac{V_2}{K} - \frac{V_2}{K} \cdot \left(\frac{R_f - KT}{R_f}\right) \quad (6)$$

where $$\sin D_p = \cos S_f \sin D \quad (7)$$

and K has the same value as in Equation 4.

In this case $\sin D_p$ is substantially equal to $$\left(\frac{V_2}{K}\right)$$

the expression $$\left[\frac{V_2}{K} \cdot \left(\frac{R_f - KT}{R_f}\right)\right]$$

representing only a small correction. The advantage of this arrangement is that by determining a value for the vector $V_2$ the major portion of the deflection $D_p$ is also determined. The deflection $D_p$ is the lateral deflection in the plane of sight and requires conversion into azimuth deflection for transmission to the gun. The azimuth deflection D varies considerably with variation in $S_f$ for any constant value of $D_p$, and consequently of $$\left(\frac{V_2}{K}\right)$$

but some assistance in the determination of D is obtained by the use of the vector $V_2$ when this is applied directly into the gun transmission as $$\left(\frac{V_2}{K_1}\right)$$

$K_1$ being a constant which has been modified to take $S_f$ into account.

The difference between D and $$\left(\frac{V_2}{K_1}\right)$$

is determined in mechanism giving the solution to Equation 5.

In my co-pending United States patent application Serial No. 211,842 filed June 4, 1938, there is described fire control apparatus which includes several gear groups designed for carrying out certain calculations. Amongst these gear groups there is one which is intended for the calculation of $V_1$, $V_2$ and $V_3$, where these quantities have the values indicated above. The present description shows how the invention may be employed in the gear group just indicated, and it will suffice only to give a short indication of the function of such gear group.

The gear group has associated with it an elevating and training sight indicated generally at 1. There is an elevating handwheel 2 and a training handwheel 3, which operate shafts 4 and 5 respectively. The shaft 5 is connected with the pointer 6 associated with a balance disc or dial 7, the pointer 6 and dial 7 together constituting the training balance dial having markings thereon so that the pointer may be brought in a particular positional relation with respect to the dial, in a manner well known in connection with balance dials. There is a control handwheel 8 which is intended to be turned proportional to $V_2$. The handwheel 8 drives a shaft 9 which is connected with one side of a differential gear 10 on which there may be introduced any subsidiary corrections by means of a shaft 11. The output shaft 12 from the differential gear has its output brought upon one member of a calculating mechanism 13. The shaft 4, which rotates according to sight elevation, drives a shaft 14 which enters a differential gear 15. Present range ($R_p$) is also set upon the differential gear 15 by means of the shaft 16 which derives its motion in a manner to be explained hereinafter. The output shaft 17 from the differential gear 15 operates a lead screw 18 of a calculating mechanism 19 which includes a quadrant 20. The shaft 4 drives a shaft 21 on which there is carrier a pinion 22 meshing with teeth on the quadrant 20. It will be understood that the differential gear 15 is introduced in order to compensate for angular adjustment that may be given to the quadrant 20, that would otherwise affect the setting of the quantity $R_p$. The output link 23 of the mechanism 19 moves in accordance with ($R_p \cos S_p$) and this is applied to a reciprocal cam 24 which thus sets $$\left(\frac{1}{R_p \cdot \cos S_p}\right)$$

into the calculating mechanism 13. This mechanism primarily comprises a link pivoted at 13' and moved by cam 24 which in turn is actuated by the pinion 24' meshing with a rack 23' of the output link 23. This output link has upon one arm a slot 19' in which a pin 101 of a feed block 102 is slidable set feed block being shifted along the feed screw 18 by means of a bevel gear 18' meshing with the bevel gear 17' of shaft 17 while the gear segment or quadrant 20 is partly rotatable upon the same axis as bevel gear 17' while the teeth 20' of said quadrant mesh with pinion 22 on shaft 18'. Returning to calculating mechanism operated by cam 24, a link 103 pivoted at 104 has a pin or stud 105 also engaging against the contour of cam 24, so that link 103 as well as link 13 will be simultaneously shifted and retain in attained positions by said cam. The left end of link 103 is connected to a vertical link 106 at 107, the link 106 connected to the block 108 having a pin 109 slidable in a slot 111 in link 13, while said block 109 is itself slidably fitted in the slide 110.

The calculating mechanism link 13 is connected with a variable speed gear 25, by means of a pin 25' fitting slidable in a second slot 115 in link 13, while said member 25 has a roller 16 pivoted thereto which engages the cylindrical member 26' forming an output member of a shaft 26, while the roller 116 engages upon the upper surface of a rotatable disc 112 rotating with the worm gear 113 operated by a worm 114 on meshing therewith and fixed upon shaft 43 whereby the output member of the output shaft 26 moves according to $$\left(\frac{V_2}{R_p \cdot \cos S_p}\right)$$

which movement is transmitted to the shaft 27 which drives the balance dial 7. It will now be understood that if the handwheel 8 is being moved so that the generated training produced upon the shaft 27 and the actual training produced upon the shaft 5 are such as to keep the pointer and dial in balance, then the handwheel 8 is being turned according to $V_2$, since the rate of training is taken to be equal to the quantity $$\left(\frac{V_2}{R_p \cdot \cos S_p}\right)$$

by the relative operations of quadrant 20, calculating mechanism 13, shiftable variable speed gear 25 and output members 26' etc. (This follows from the vector analysis already explained in the present specification.)

As already indicated, there is a shaft 21 which is driven from the shaft 4 actuated by the elevating handwheel 2. The shaft 21 also drives the pointer 28 of an elevating balance dial 29. There is a handwheel 30 which, by means of a shaft 31, drives onto a differential gear 32. The latter may have a further input shaft 33 upon which may be set subsidiary corrections. For the present purposes it will be supposed that there is a zero subsidiary correction. In this case, the handwheel 30 is intended to be turned with a movement that represents $V_3$. This movement is set into calculating mechanism 34, into which there is also set the present range ($R_p$) by means of a shaft 35 which connects with the shaft 16. A reciprocal cam 36 of the mechanism 34 causes $$\frac{1}{R_p}$$

to be set into a multiplying linkage whereby the output from the mechanism 34 represents $$\frac{V_3}{R_p}$$

This is set into a variable speed gear 37 which drives a shaft 38 at a speed corresponding to $$\frac{V_3}{R_p}$$

Thus, the variable speed gear 37 and its pertinences are similar to variable speed gear 25 with its related mechanism as already described with reference to calculating mechanism 13, 24, 25, 26, etc. when the generated elevation upon the shaft 38 is equal to the elevation upon the shaft 21 as derived directly from the elevating sight, it is then known that the handwheel 30 has been moved according to $V_3$. Hence, the generated elevation, or rate of change of elevation $$\frac{d\,sp}{dt} = \frac{V_3}{R_p}$$

(For reasons which are clear from the vector analysis referred to above.)

The variable speed gears 25 and 37 so far described, are of well known type and have a constant speed input derived from a constant speed motor 40 which operates a shaft 41 to which there is connected shafts 42 and 43 which respectively connect with the variable speed gears 37 and 25 by means of worms and worm gears as shown in Figure 1.

The range balance dial is indicated at 44, and it will be understood that the pointer 45 thereof is driven from an external source by a shaft 46, the range being continuously ascertained at such source. There is a handwheel 47 that is to be adjusted according to $V_1$, and it will be seen that this handwheel drives onto a shaft 48 which is connected by means of bevel pinions 49 and 50 with a differential gear 51. There is a drive upon a shaft 52 also to the differential gear 51 for the introduction of any subsidiary corrections that may be required. For the moment it will be assumed that a zero correction is introduced. Thus, the output shaft 53 from the differential gear 51 turns in accordance with $V_1$, and moves the adjustable element of a known ball and disc type of a variable speed gear 54 by rotating the feed screw 55' on shaft 53 so as to bring said variable speed gear 54 into various displaced positions between cylinder 117 and disc 118 rotatable with the worm gear 119 which in turn meshes with worm 120 which has a constant drive connection 55 from the constant drive shaft 41. The output shaft of the variable speed gear 54 drives into a differential gear 56 which has an output shaft 57 moving in accordance with present range. The shaft 57 drives onto the dial 44 and, as will be understood, when the handwheel is being turned at a speed such as to keep the dial 44 and the pointer 45 in balance, it will be known that the handwheel 47 is being turned to represent $V_1$. The shaft 57 drives a worm 99 which serves to rotate a disc or dial 44 having a pointer 45. The latter is arranged to be rotated by a receiver 100, which constitutes the receiver of a range transmission system operated from a range-finder external to the present apparatus. In other words, the output shaft 57 moves in accordance with present range when the dial 44 is in line with the pointer 45. The speed at which the pointer and dial rotate is a measure of the range rate $V_1$, but the pointer and the dial could move at the same rate without necessarily being in line, in which case the shaft 57 would, of course, not move in accordance with present range. The differential gear 56 is introduced in order to allow a range tuning handwheel 58 to be employed, the latter driving a shaft 59 that is geared into the differential gear 56 to allow the necessary range adjustment or bringing dial 44 into line with the pointer 45 by means of the hand wheel 58 to be carried out. In order to assist in the range setting, a range accelerating mechanism is employed. For this purpose, the handle 30 that moves in accordance with $V_3$ transmits via the shaft 31 a movement to a shaft 60 which drives onto a worm 61 which is adapted to co-operate with a cam 62. The latter has a follower 63 formed integrally with a quadrant 64 co-operating with a pinion 65. The cam 62 has its profile so designed as to lift according to the square of $V_3$. Thus the output member 65 may be regarded as having a movement corresponding to $V_3^2$. This movement is transmitted upon a shaft 66 to a differential gear 67. In like manner the shaft 9 that moves according to $V_2$ is connected with a shaft 68 which drives a worm 69 co-operating with a cam 70. The latter has a follower 71 combined with a quadrant 72 actuating a pinion 73. The final movement of the pinion 73 corresponds to $V_2^2$. There is a shaft associated with the pinion 73, this shaft 74 connecting into the differential gear 67. The output from the differential gear 67 is taken upon a shaft 75 which thus moves according to the sum of the squares of $V_2$ and $V_3$.

Mechanism is also provided for dealing with $V_1$ in the same manner as that in which $V_2$ and $V_3$ are dealt with. Thus the shaft 48 that moves according to $V_1$ drives a shaft 76 which turns a worm 77. The worm co-operates with a cam 78 having a follower 79 with which there is combined the quadrant 80 driving onto a pinion 81 on a shaft 82. The shaft 82 moves according to the square of $V_1$. The shaft 75 drives into a differential gear 83 which also receives the output from the shaft 82. The output shaft 84 of the differential gear 83 moves, therefore, in accordance with the sum of the squares of $V_1$, $V_2$ and $V_3$. It may, therefore, be said that the shaft 84 moves in accordance with the square of V, this being the velocity vector of which $V_1$, $V_2$ and $V_3$ are the three component vectors. The shaft 84 drives a pointer 85 associated with a dial 86, which is shown in greater detail in Figure 2. The graduations 87 on the dial are not linearly displaced for the reason that it is desired that the dial should indicate the square root of the quantity $V^2$. It will be readily appreciated that a simple calibration of the dial will allow such indication. With the dial in the position shown, it will be realised that V is equal to 100.

From the description above, it will be seen that when the handwheel 47 is being operated so as to preserve the balance on the dial 44, then the magnitude of V, the actual target speed vector, will be indicated on the dial 86. In practice the change in range of target is difficult to follow whilst, however, from a knowledge of the nature of the target, for example, in the case of aircraft, a knowledge of the type of aircraft concerned, V may be estimated with a fair degree of accuracy. An alternative method of operation of the prediction apparatus is, therefore, to assume an estimated value for V, and to adjust the handwheel 47 until this value of V appears on the dial 86. Thus, there is a ready method at hand for obtaining a value for $V_1$, with a fair degree of accuracy. This value for $V_1$, as it appears on the shaft 48, may be utilised in other parts of the prediction apparatus.

In addition to the apparatus described above, there is the usual mechanism for producing range acceleration, based on the assumption that $$\frac{d\,V_1}{dt} = \frac{V_2^2 + V_3^2}{R_p}$$

when using $R_p$ as a constant. This assumption holds good for any target moving along a straight line.

$$\frac{V_2^2 + V_3^2}{R_p}$$

is the acceleration of range and the integration of this expression is effected in the variable speed gears 92 and 94, the integrated value being measured by the rotation of the output shaft 96 and the constant of the integration being applied as necessary by the handle 47. The resultant answer measured by the rotation of the shaft 53 is integrated in the variable speed gear 54, the integrated value being measured by the output shaft of the V. S. D. and the constant of the integration being applied as necessary by the handle 53. The result of the double integration is present range as measured by the dial 44.

The amount of the constant of the first integration is applied at the handle 47 by reference to the pointer and the dial 85 and 86. Assuming that a target approaches from maximum range $V_2$ and $V_3$ will have small values while $R_p$ will be large, i. e.

$$\frac{V_2{}^2 + V_3{}^2}{R_p}$$

will be small, also $V_2{}^2 + V_3{}^2$ will be small, and $V_1$ large. The initial setting made at handle 47 or the constant of the first integration is thus practically equal to V. The pointer 45 will indicate a large range as measured by the rangefinder and when the dial 44 is brought into line with the pointer by means of the handle 58, the amount of movement applied by the handle 58 is the constant of the second integration. These constants are not necessarily the correct constants, for as the range is reduced, the dial 44 and the pointer 45 may not be moving at the same speed, in which case the first constant is adjusted by the handle 47 to make them move at the same speed and the second constant is adjusted by the handle 58 by re-alignment of the dial and pointer. For this purpose present range is transmitted from the shaft 57 via shafts 88, 89 and 90 to a mechanism 91 which sets the reciprocal of present range into a variable speed gear 92. The shaft 89, incidentally, affords the drive to the shaft 16 which has to rotate in accordance with $R_p$. The output from the variable speed gear 92 is taken upon a shaft 93 which enters a further variable speed gear 94, the ratio of which is controlled by a shaft 95 connected with the shaft 75. It will be recalled that the shaft 75 is turned in accordance with the sum of the squares of $V_2$ and $V_3$, so that the output shaft 96 from the variable speed gear 94 turns in accordance with the rate of change of $V_1$, since such rate is taken as being equal to the sum of the squares of $V_2$ and $V_3$ divided by present range. The output from the shaft 96 is transmitted via a shaft 97 to a differential gear 98 included in the shaft 48. Thus, an acceleration approximating to that associated with the component $V_1$ is introduced into the mechanism to simply further the setting of $V_1$. This follows from the displacement of the variable speed gear 94 along the feed screw 121 so that said gear 94 is shifted along a roller 122 of shaft 96 and the toothed disc 123 meshing with the gear 124 of shaft 93.

The invention has been described above with particular reference to a part of the prediction apparatus forming the subject of my co-pending United States patent application Serial No. 211,842 filed June 4, 1938. It will, however, be understood that the invention is generally applicable in the ascertaining of one of a number of components of a particular vector, where the value of that vector is known or may be estimated. The same general principles would apply to each particular case.

What I claim and desire to secure by Letters Patent of the United States is:

In predictor or calculator apparatus for use in the fire control of anti-aircraft guns, means for determining the vector component $V_1$ with a knowledge of $V_2$ and $V_3$ and an estimated value of V (where these symbols have the meaning assigned to them in the specification) comprising a first mechanism having an input connection intended to move according to the magnitude of $V_2$, said mechanism producing an output according to the square of the magnitude of the vector $V_2$, an output connection from said first mechanism to a shaft, a second mechanism of the same nature as the first, an input connection to said second mechanism and adapted to move according to the vector component $V_3$, an output connection from said second mechanism, a differential gear arranged in said shaft and receiving upon its centre member the output from said second mechanism, a third mechanism of the same nature as the first and second, an input connection thereto arranged for hand operation, an output connection from said third mechanism, a second differential gear in said shaft, the middle member of which receives the output from the output connection of said third mechanism, indicating means including a dial and pointer device for indicating the resultant movement of said shaft as modified by the first and second differential gears, said graduations being such as to allow indication of the square root of the magnitude of such movement, and a third differential gear disposed in said input connection to the third mechanism and a connection to the middle member of such third differential gear to receive a movement proportional to $$\left( \frac{V_2{}^2 + V_3{}^2}{R_p} \right)$$

where $R_p$ is the present range.

JOHN PERCIVAL WATSON.